(12) United States Patent
Royer

(10) Patent No.: US 6,593,550 B1
(45) Date of Patent: Jul. 15, 2003

(54) ENERGY SAVINGS CIRCUMFERENTIAL BASE FOR COOKING UTENSILS

(76) Inventor: George R. Royer, 2137 Ragan Woods Dr., Toledo, OH (US) 43614

( * ) Notice: Subject to any disclaimer, the term of this patent is extended or adjusted under 35 U.S.C. 154(b) by 0 days.

(21) Appl. No.: 10/052,124

(22) Filed: Jan. 16, 2002

(51) Int. Cl.7 .............................. A47J 36/00; A47J 36/30
(52) U.S. Cl. ..................... 219/429; 219/432; 219/433; 126/24
(58) Field of Search ................. 219/429, 432, 219/433, 456.1; 126/24, 83, 214 D

(56) References Cited

U.S. PATENT DOCUMENTS 3,960,134 A * 6/1976 Scott ........................... 126/24
5,638,806 A * 6/1997 Foust .......................... 126/24

FOREIGN PATENT DOCUMENTS

JP          9-210318    *   8/1997
WO          9312702     *   8/1993

* cited by examiner

Primary Examiner—Joseph Pelham

(57) ABSTRACT

The subject device is an energy savings ring for cooking utensils placed on a stove burner with the subject device being a perimeter ring-like member or other generally perimeter member adapted to surround all or part of the outer circumference of the cooking utensil so that part of the outer circumference of the cooking utensil is surrounded by the inner circumferential wall of the perimeter member with the perimeter member being structured to receive heat from the stove burner on its lower surface, and then transfer such heat upwardly into the inner circumferential surface of the perimeter member to be transferred in turn to the outer circumferential surface of the cooking utensil.

3 Claims, 2 Drawing Sheets

ENERGY SAVINGS CIRCUMFERENTIAL BASE FOR COOKING UTENSILS

DISCUSSION OF PRIOR ART AND BACKGROUND OF INVENTION

The subject invention pertains mainly to the process of heating cooking utensils on ceramic or flat burner units, although the subject invention may be applicable to other types of stove burners. In this respect, the subject invention comprises an improvement in the efficiency of cooking on stoves.

In conventional stove structures, particularly ceramic covered burners, the burner units are usually flush with the upper surface of the stove, or in other burner types may be raised slightly above the upper surface of the stove. In the usage of burners that are relatively level or flush with the upper surfaces of the stove, there are several heating efficiently concerns involved, and other problems, as more fully described below.

First, a cooking utensil disposed on top of a stove burner is readily susceptible to being moved or pulled off the burner and either upset or pulled off the stove. This poses a particularly troublesome problem for young children that are playing in and around a stove, as a heated cooking utensil may be inadvertently moved off the stove top and cause accidental burns. A second problem encountered is that a substantial amount of heat is wasted in the process of heating a cooking utensil on a stove top burner. In particular, when a pan or other type of cooking utensil is heated on top of such a burner, only the very bottom of the pan is heated, and in the process, the heating takes a greater period of time since only the bottom is heated and significant amount of heat rises up and around the sides of the cooking utensil and into the air. This wasted heat represents a loss of energy that could be otherwise used to help heat the cooking utensil in the process and thus save energy. One of the causes of this heat loss in this regard is that the bottom of the cooking pan, or other such utensil only covers a partial part of the upper surface area of the burner. As a result that portion of the burner not covered by the bottom of the pan rises upwardly in the air around the pan, a substantial amount of which is thus wasted.

It is sufficient to state at this juncture that the overall conceptualization of the subject invention involves a device that can be placed on top of a stove burner to surround a cooking utensil for purposes of saving heat loss from the burner unit and directing a larger amount of the burner heat towards the cooking utensil. An auxiliary function of the device can be to help prevent cooking utensils from being inadvertently moved off the burner unit.

In view of the foregoing, the subject invention is conceived and the following object of the subject invention are directed accordingly.

OBJECTS OF THE INVENTION

It is an object of the subject invention to provide an improved device for conserving heat from a stove during cooking processes;

Still another object of the subject invention is to provide an improved structure that improves safety in the usage of a stove when cooking food;

Another object of the subject invention is to provide an improved heat savings device to be used when cooking on a stove;

Still another object of the subject invention is to provide an improved heat savings device to be used when cooking on a stove;

Still another object of the subject invention is to provide a supplemental heat transfer member for energy conservation purposes for use in cooking on a stove;

Yet another object of the subject invention is to provide an improved safety apparatus for cooking stoves;

A further object of the subject invention is to provide an improved device that provides optimal energy conservation and safety features for a cooking utensil on a stove surface;

Another object of the subject invention is to provide a device that will improve the efficiency of the cooking process on stoves;

Other and further objects of the subject invention will become apparent from a reading of the description taken in conjunction with the claims.

DESCRIPTION OF GENERAL EMBODIMENT AND SUMMARY OF INVENTION

Figure 1:
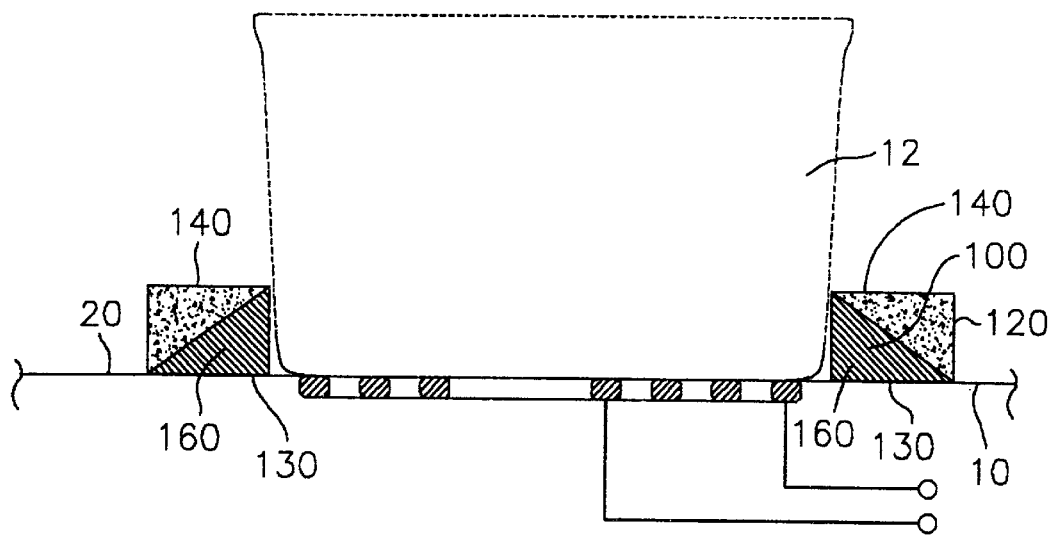
FIG. 1 is a side elevational view, in section, of the subject invention without a cooking utensil in place.

The subject device is an energy savings perimeter member for cooking utensils placed on a stove burner with the subject device being a perimeter member adapted to encircle in part or in whole the bottom circumference of the cooking utensil so that the lower bottom circumference of the cooking utensil is partially or wholly surrounded by the inner circumferential wall of the perimeter member with the perimeter member structured to receive heat from the stove burner on its lower surface. The ring member then transfers such heat upwardly into the inner circumferential surface of the perimeter member to be transferred to the outer surface of the cooking utensil.

In the preferred embodiment as discussed below, the perimeter member may be enclosed, that is a complete surrounding member or may have an incomplete perimeter. Moreover, as discussed the perimeter member is preferably a ring like member adapted to surround comformingly a circular or rounded pan outer surface.

In this latter respect, the subject invention has application to any type of stove, including electric, gas, ceramic type stoves and similar types of cooking stoves. In a general perspective however, the subject invention is also applicable to other types of stoves on which variant types of cooking utensils are attempted to be heated in the cooking process.

In the general embodiment of the subject invention, the subject device is a perimeter member adapted to be laid flush on the upper surface of a stove burner with such perimeter member being adapted to receive within the confines of such perimeter member the bottom circumferential portion of a cooking utensil. As stated, a ring member is preferable, and the body portion of the ring member is comprised of a heat conducting substance such as a ceramic or metallic or other suitable substance, however, the exterior circumferential portion of the ring is comprised of an insulation material. By this latter arrangement, as the bottom of the ring member sets flush against the upper surface of the burner, it will conduct heat upwardly through its circumferential body upwardly to the inner circumferential interior surface that embraces the lower circumferential portion of the cooking utensil. In the process with the bottom of the ring member being large enough to cover the most of the area of the burner not covered by the utensil, heat from a significant portion of the burner not covered by the utensil will be transferred through the inner circumferential surface of the ring to the part of the circumferential outer surface of the cooking utensil to supplement the heat transferred to the very bottom surface of the utensil from the burner unit. In the overall process, a substantial amount of the heat emanating from the burner will be saved to render the cooking process more efficient.

DESCRIPTION OF PREFERRED EMBODIMENT

The following description of the subject invention covers one preferred embodiment, and description of such a particular and preferred embodiment shall not restrict the scope of the invention, as set forth in the claims herein. The general embodiment of a perimeter member of any shape is best embodied in a circular ring, as a closed loop member or open loop member.

As can be seen in the drawings, a stove 10 is shown. Stove 10 can utilize any type of heating system for heating the burner elements, such as electrical, gas or any other type of energy source. Moreover, the subject invention can be adapted to stoves in which the burner members are ceramnic, glass, metallic electric elements or gas fed, resistance coils, or any other types of burner elements. In this respect, the invention is also made applicable to recessed burner units or burner units that have upwardly extending surrounding walls and a bottom surface, either fully or partially surrounded the upwardly extending walls. However, the most practical application of the subject device is to stoves having flat upper surface burner units that are flush with the upper surface of the stove.

The inventive concept herein incorporates the concept of including additional heat transfer means to the cooking utensil to provide additional heat input in conjunction with the heat provided directly to the bottom of the cooking utensil from the burner, thereby adding heat input to the cooking utensil from the burner, and thereby maximize the heat input to the utensil. The result of such a heating system helps additionally to minimize the heat loss in the cooking process, and improve the efficiency of the cooking process.

Figure 4:
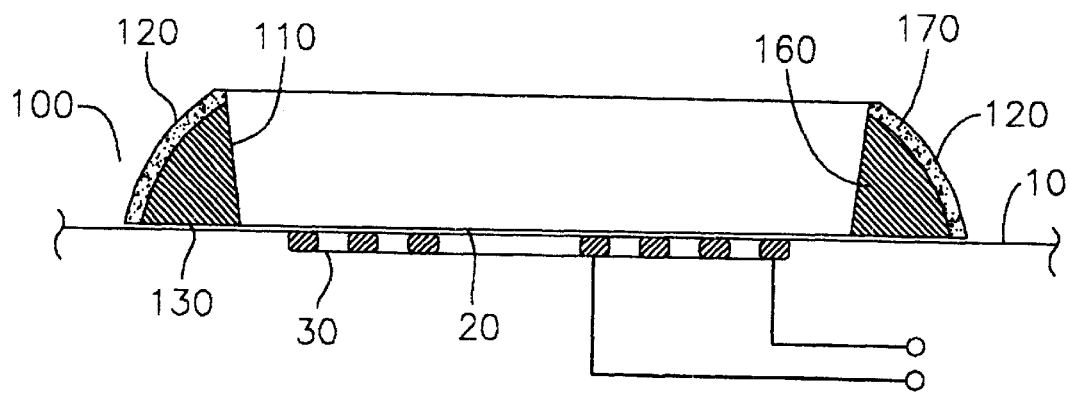
FIG. 4 is a side elevational view showing a flat stove burner with a conventional cooking utensil, demonstrating schematically the heat losses up around the vertical surfaces of the cooking utensil.

For purposes of schematically showing the inefficiency of using stove top burners for cooking, FIG. 4 demonstrates graphically the heat loss that occurs on a flat stove burner under circumstances where the bottom of a cooking utensil 15 does not cover the entire area of the burner. As can be seen in FIG. 4, heat rises up the sides of the cooking utensil from areas of the burner that are not covered by the utensil 15. This heat is mostly wasted and rises in the air unused, as demonstrated graphically in FIG. 4.

More specifically, for purposes of placing the subject invention in the perspective of the objectives herein, FIG. 4 shows a stove 10 with a stove top 20 having a conventional flat burner 32 that is essentially flush with the upper surface 20 of the stove 10 as seen only the very bottom surface 33 of the cooking utensil 15 is heated on such burner with attendant loss of heat up and around the sides of the utensil, as shown schematically in FIG. 4.

For purposes of describing the preferred embodiment of the subject invention cooking stove utilizing flat or ceramic burner units will be referenced and discussed as stated, however such a reference will not be considered as limiting the subject invention to such types of stoves.

Accordingly, FIG. 10 shows an upper cooking surface 20 that incorporates and utilizes one or more ceramic covered heating elements such as heating element burner 32 variantly referred to as a burner unit. Again, while the drawings and description are mostly directed to a ceramic burner type stove, as stated above, the subject invention is equally applicable to the stove types using gas or other forms of heat source, heat transfers or other means as the heating mediums. Thus, the following description of an electric ceramic covered burner unit for a stove 10 will be considered in discussing the preferred embodiment and will not be construed as limiting the scope of the subject invention.

Figure 2:
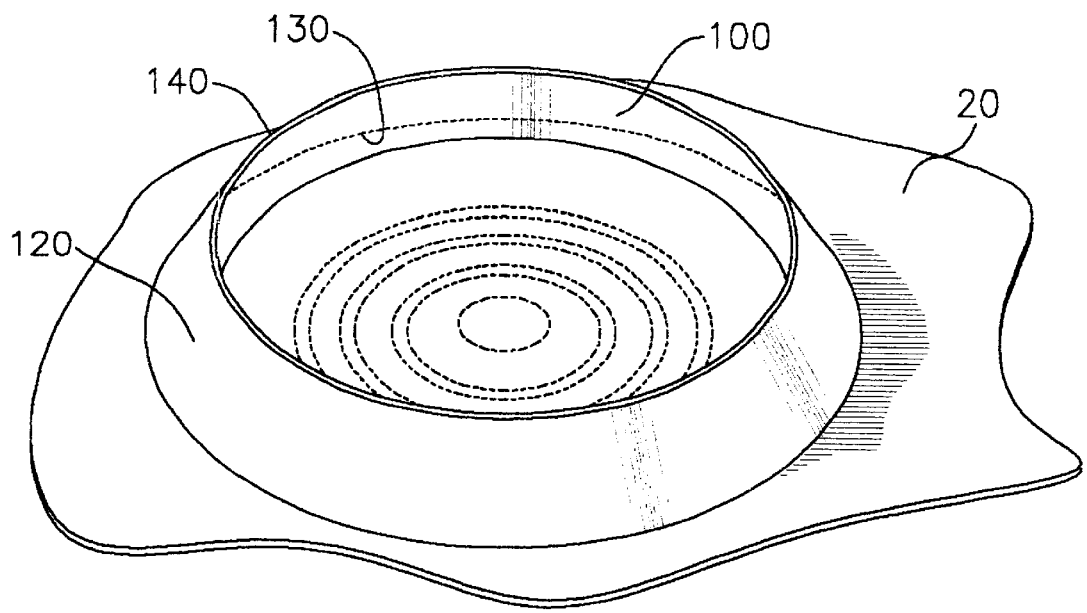
FIG. 2 is a top elevational view of the subject invention.
Figure 3:
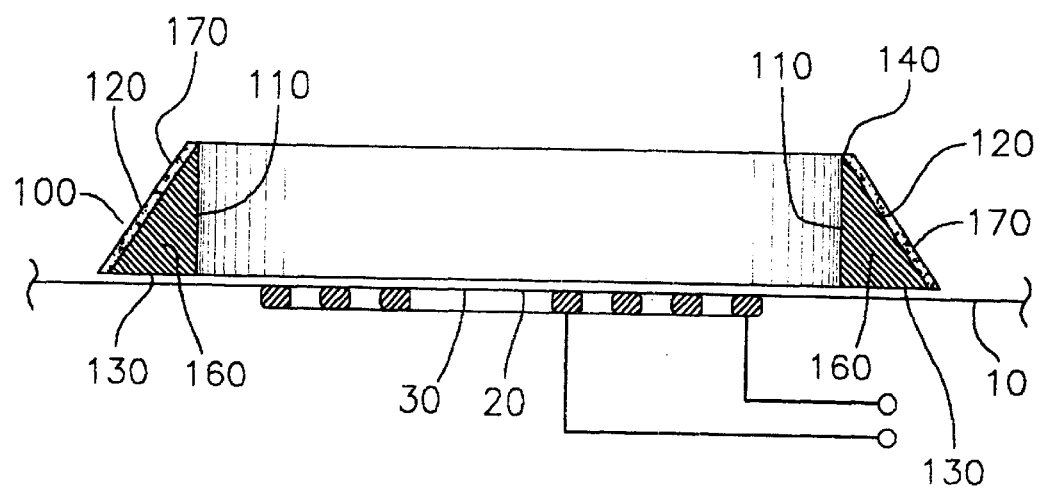
FIG. 3 is a side elevational view of the subject invention, in cross-sectional configuration, showing the subject invention with a cooking utensil in place.

Referring now to the drawings in which a preferred embodiment of the subject invention is shown, and particularly FIGS. 1, 2, and 3, a ring like member 100 is shown as incorporating features of the subject invention. The ring like member 100 is preferably an enclosed circular ring-like member which has an inner circumferential surface 110 and outer circumferential surface, 120. The ring member 100 additionally has a bottom surface and an upper surface 140, the bottom surface 130 is preferably a flat surface which is used as the surface of ring member 100 adapted to rest flush against the upper surface of the burner unit 32, as seen in FIG. 3.

Moreover, as seen in FIG. 3, there does not have to be an upper or surface as long as there is at least a bottom surface. In other words, if there is no upper surface the outer circumferential surface 120 and inner circumference surface 110 merge at an apical point. As can be seen from the drawings, the upper surface 140 in not necessarily flat nor is it necessary to have the same width as the bottom side surface 130. The latter described structural attributes are not considered as limiting the scope of the subject invention. Moreover, the ring member 100 need not be a closed member, but can be opened at some point along the circumference surface of the ring with appropriate hinges or other means not shown to open or close the ring. Other embodiments may include a means to adjust the circumference of the ring member 100.

In the preferred embodiment the ring member 100 has a portion that is heat conducting, as opposed to being non-conducting or insulated. As seen in the drawings, the heat conducting portion 160 or the ring member 100 preferable extends from the bottom circumferential surface 130 to the inner circumferential surface 110. In conjunction with this latter facet, the insulation portion extends from a portion near the bottom surface to the outer circumferential surface 120. This enables the heat to move directly as it rises from the bottom surface 130 through the heat conducting portion 160 to the inner circumferential surface 110 and thence to the outer side surface 140 of the cooking utensil 35.

For this purpose, it is preferable that the inner circumferential surface of the ring be just slightly larger than the outer circumferential extent of the bottom or other portions of the cooking utensil 15. It is envisioned that rings of various circumferential sizes may be produced to accommodate pans and cooking utensils of different sizes.

As stated in the preferred embodiment of the subject invention it is optional to structure the ring member with a non-heat conducting material i.e. an insulating material, on or near the outer circumferential surface position 120 of the ring member 100 so that the heat is trapped and directed through the heat conducting portion 160 near the inner circumferential surface 110 100 and does not move to the outer circumferential surface 120 of the ring member 100 and thus be dissipated through such outer surface. The object is to have the heat transfered through the ring move to the inner circumferential surface 110.

As can be seen in the drawings, the ring member 100 is placed on top of the stove burner as seen in the drawings with the bottom surface 130 flush with the surfaces of burner 32 and the cooking utensil is then placed in a conforming circumferential manner on the stove burner within the inner circumference surface 110 of the ring member 100 for the cooking process. In this overall process, a substantial amount of the heat emanating from the burner will be saved to render the cooking process efficient.

It is to be noted at this point that the member that incorporates features of the subject invention may be shaped other than as a ring member, and does not necessarily have to be a closed member, in a closed loop perspective. Moreover, the member need not be circular, and may, for example, be rectangular on its outer surface or perimeter or any other shape. Also, the inner perimeter of the member may be other than round. In short, there may be various shapes utilized for the member.

What is claimed is:

1. A heat savings device to help efficiently draw heat from a stove burner to heat a cooking utensil with an outer upright side surface, said heat savings device to be placed around said outer upright surface of said cooking utensil, comprising:

(a) a ring member comprising a non-heat conducting outer circumferential surface and a heat conducting inner circumferential surface, said ring member having a bottom circumferential surface disposed between said outer circumferential surface and said inner circumferential surface, said ring member having a portion thereof that is comprised of heat conducting material extending from said bottom circumferential surface to said inner circumfrential surface.

2. A supplementary heat collecting member for imparting heat from a stove burner to a cooing utensil wherein said cooking utensil has an outer utensil surface comprising:

(a) a base member having a lower surface to be placed against the stove burner, said base member having an upwardly extending portion extending from such lower surface, wherein said upwardly extending portion has a first side surface to be placed against a portion of said outer utensil surface of said cooking utensil and a second side surface, and wherein said base member is comprised of heat conducting means adapted to draw heat upwardly from said lower surface, of said base member to said side first surface, and wherein said second side surface is comprised of heat insulation means.

3. A heat savings device to help efficiently draw heat from a stove burner surface to heat a cooking utensil with an outer upright side surface, said heat savings device to be placed on said stove burner surface and a portion of said cooking utensil, comprising:

(a) a base member comprised of heat conducting material and having an upper surface and a lower surface and said base member having an outer upright surface and said base member having an interior spatial area extending from said upper surface to said lower surface of said base member, and wherein said base member has an inner upright surface that forms the outer extent of said interior spatial area, and wherein the lower surface of said base member is adapted to be placed against the stove burner surface with a portion of said inner upright surface contacting a portion of the outer upright surface of said cooking utensil.

\* \* \* \* \*